United States Patent [19]

Osmotherley et al.

[11] 4,238,067

[45] Dec. 9, 1980

[54] DRYING OF CAVITIES

[75] Inventors: Owen B. Osmotherley; John M. Lowes, both of Dalton-in-Furness, England

[73] Assignee: Vickers Limited, London, England

[21] Appl. No.: 52,094

[22] Filed: Jun. 26, 1979

[51] Int. Cl.³ .................... B23K 20/08; F27B 3/00
[52] U.S. Cl. ................................ 228/107; 34/9; 34/12; 228/219
[58] Field of Search .............. 34/9, 12, 104, 243 R; 228/101, 107, 219

[56] References Cited

U.S. PATENT DOCUMENTS

| 3,589,023 | 6/1971 | Figiel | 34/9 |
| 3,888,693 | 6/1975 | Schevey et al. | 34/9 |
| 4,085,518 | 4/1978 | Jackson et al. | 34/104 |

Primary Examiner—John J. Camby
Attorney, Agent, or Firm—Larson, Taylor and Hinds

[57] ABSTRACT

Water filled cavities are dried by replacing the water with a first liquid which is miscible with water and this is then replaced by a second liquid which is miscible with the first and which has a high vapor pressure. The second liquid is then replaced by a gas. The invention is particularly useful for removing water from between members which are to be explosively welded together underwater so as to improve the quality of the welded joint obtained.

8 Claims, 1 Drawing Figure

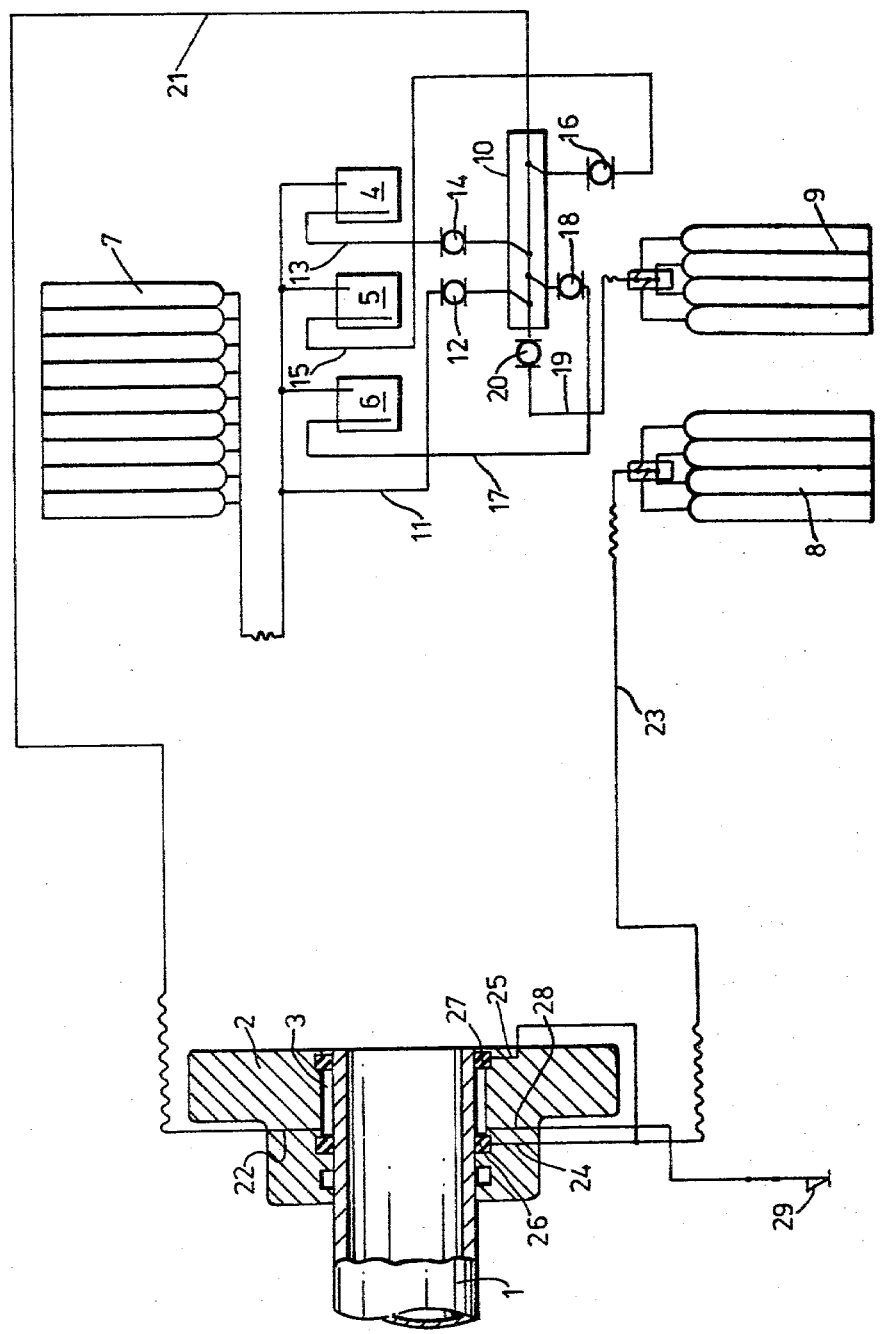

DRYING OF CAVITIES

This invention relates to the drying of a water filled cavity and more particularly, but not exclusively, is concerned with the drying of a cavity formed between two submerged members which are to be explosively welded together.

Explosive welding is a useful technique for securing together an underwater pipe and another tubular member such as a flange. In such operations, the pipe is inserted into the other tubular member so that the outer surface of the pipe and the inner surface of the other tubular member are spaced apart to form a cavity. Thereafter, an explosive charge is located adjacent to the inner surface of the pipe so that, on detonation, the outer surface of the pipe is urged across the cavity and against the inner surface of the other tubular member so as to become welded thereto. Ordinarily, the cavity will be full of water, probably seawater, and in order to produce an optimum weld, it is necessary to remove this water, and any other contaminants such as salts or debris from the cavity.

According to one aspect of the present invention there is provided a method of drying a water filled cavity which method comprises (i) removing the water from the cavity and introducing into the cavity a first liquid which is miscible with water, (ii) removing said first liquid from the cavity and introducing into the cavity a second liquid which is miscible with said first liquid and which has a high vapour pressure, and (iii) introducing a gas into said cavity to remove said second liquid.

According to another aspect of the present invention there is provided an apparatus for use in accordance with the above defined method which apparatus comprises a framework supporting a source of said first liquid, a source of said second liquid, a source of said gas, and pipework for connecting said sources to said cavity and including control means whereby any of said sources can be put in communication with said cavity so that the first liquid, second liquid or said gas can be introduced into said cavity as desired.

In a particularly preferred embodiment, the first liquid is a mixture of isopropanol and trichlorotrifluoro ethane (Freon 113) and the second liquid is dichloro difluoro methane (Freon 12). The gas used to remove said second liquid from the cavity (and also to remove the water and said first liquid from the cavity) is preferably nitrogen. If desired, the nitrogen finally left in the cavity may be replaced by helium in which case the apparatus of the present invention additionally includes a source of helium. Further, in the case where the cavity is initially filled with seawater, it is particularly preferred to remove the seawater from the cavity (by driving it out using for example nitrogen gas) and to then introduce demineralised water into the cavity prior to introducing said first liquid.

For a better understanding of the invention and to show how the same may be carried into effect, reference will now be made, by way of example, to the accompanying drawing which shows schematically an apparatus in accordance with the invention.

Referring to the drawing, there is shown a pipe 1 which is submerged in the sea and is to be explosively welded to a flange 2. The flange 2 is fitted on the end of the pipe so that a generally annular cavity 3 is formed between the inner surface of the flange 2 and the outer surface of the pipe 1. The cavity 3 will contain seawater which has to be removed if a satisfactory weld is to be obtained. The apparatus of the present invention includes a framework (not shown) to which is secured a container 4 for demineralised water, a container 5 for a first liquid which is a mixture of Freon 113 and isopropanol, and a container 6 for a second liquid which is Freon 12. Also attached to the framework is a first source of dry nitrogen gas 7, an auxiliary source of nitrogen gas 8, and a source 9 of helium. The framework carries a manifold 10 to which each of the sources 4, 5, 6, 7 and 9 is operably connected by pipework. More particularly, nitrogen source 7 is connected to the manifold 10 via a pipe 11 including a ball valve 12, demineralised water container 4 is connected to the manifold via a pipe 13 including a ball valve 14, first liquid container 5 is connected to the manifold via a pipe 15 incorporating a ball valve 16, second liquid container 6 is connected to the manifold via a pipe 17 including a ball valve 18, and helium source 9 is connected to the manifold via a pipe 19 and a ball valve 20. The ball valves 12, 14, 16, 18 and 20 are preferably operated by spring loaded actuators (not shown) which, in turn, are operated by helium gas controlled by solenoid valves (not shown). In this case, the framework may carry an additional source of helium gas (not shown) to operate the actuators. A pipe 21 leads from the manifold 10 to a nozzle 22 provided in the flange 2 at the top of the pipe and then into the cavity 3. The nozzle includes a vent pipe and non-return valve (neither being shown) for a purpose to be described. A pipe 23 leads from the auxiliary nitrogen source 8 to conduits 24 and 25 in the flange 2 and thence to first and second inflatable annular seals 26 and 27 which are located in the cavity 3. The flange 2 also includes a vent pipe in the form of a conduit 28 linking the cavity 3 with a one-way valve 29.

In use, the apparatus is lowered from the surface to the vicinity of the pipe 1 and pipes 21 and 23 are operably connected to the nozzle 22 and conduits 24 and 25 of flange 2 by quick acting couplings (not shown). A control valve (not shown) associated with auxiliary nitrogen source 8 is then actuated by the submersible so that nitrogen flows from the source into the seals 26 and 27 via pipe 23 and conduits 24 and 25 in order to inflate the seals and seal off the ends of the annular cavity. Thereafter, ball valve 1 is opened to allow nitrogen from source 7 to enter the manifold 10 via pipe 11 and thence to pass, via pipe 21 and nozzle 22 into the cavity 3 to drive the seawater out of the cavity 3 via the conduit 28.

After the seawater has been removed from the cavity 3 by the nitrogen gas, ball valve 14 is opened so that demineralised water can enter into the manifold 10 under the influence of the nitrogen gas pressure in source 7 and thence pass along pipe 21 into the cavity 3. The demineralised water flushes, out of the cavity, via conduit 28, any salts or debris which may have been left behind by the seawater originally in the cavity. The demineralised water also flushes nitrogen gas out of the cavity via the vent pipe and non-return valve of the nozzle 22. The demineralised water is then driven out of the cavity via the conduit 28 by re-opening ball valve 12 to allow nitrogen gas to enter the cavity. During this process, some nitrogen gas will escape via the vent pipe of the nozzle 22 but this is negligible compared to the overall volume of the gas. Thereafter, actuation of ball valve 14 allows said first liquid to enter the manifold 10 along pipe 15 under the influence of the nitrogen gas in source 7 and thence to pass along pipe 21 and enter the cavity 3 thus displacing the nitrogen via the vent pipes. Thereafter, ball valve 12 is once again operated to enable the first liquid to be driven out of the cavity via the conduit 28 by nitrogen gas from source 7. Then, ball valve 18 is actuated so that the second liquid may pass along pipe 17 into the manifold 10 under the pressure of the nitrogen gas in source 7 and thence along pipe 21 into the cavity to displace the nitrogen gas via the vent pipes. Thereafter, ball valve 12 is once again actuated so that the second liquid is driven out of the cavity 3 via the conduit 28 by nitrogen gas source 7. Nitrogen is continued to be passed through the cavity to remove all traces of the second liquid (and indeed any residues of the first liquid and water) from the cavity. Thereafter, ball valve 20 is actuated to allow helium gas to flow from source 9 along pipe 19 into the manifold 10 and thence into cavity 3 via pipe 21 and nozzle 22 until the nitrogen has been replaced by helium. The cavity 3 and the outer surface of pipe 1 and inner surface of flange 2 defining the cavity 3 are now in a condition which is conducive to satisfactory explosive welding. This is effected by detonating an explosive charge inside the pipe to urge the outer surface of the pipe into contact with the inner surface of the flange 2 so that these surfaces become welded together. The explosive charge may be of the inflatable type in which case it may be inflated by suitably connecting the same to the auxiliary source of nitrogen 8.

We claim:

1. A method of drying a water filled cavity which method comprises:
   (i) removing the water from the cavity and introducing into the cavity a first liquid which is miscible with water,
   (ii) removing said first liquid from the cavity and introducing into the cavity a second liquid which is miscible with said first liquid and which has a high vapour pressure, and
   (iii) introducing a gas into said cavity to remove said second liquid.

2. A method according to claim 1 wherein the first liquid is a mixture of isopropanol and trichlorotrifluoro ethane.

3. A method according to claim 1 wherein the second liquid is dichloro difluoro methane.

4. A method according to claim 1, wherein the water is removed from the cavity by introducing nitrogen gas into the cavity so as to displace the water.

5. A method according to claim 1 wherein the gas used to remove said second light from the cavity is nitrogen.

6. A method according to claim 5 and comprising the additional step of replacing the nitrogen finally eft in the cavity by helium.

7. A method according to claim 1 wherein the cavity is initially filled with seawater which comprises the additional step of washing the cavity out with demineralised water prior to introducing said first liquid.

8. A method of explosively welding together first and second members separated by a cavity filled with water which comprises (a) drying the cavity by:
   (i) removing the water from the cavity and introducing into the cavity a first liquid which is miscible with water,
   (ii) removing said first liquid from the cavity and introducing into the cavity a second liquid which is miscible with said first liquid and which has a high vapour pressure, and
   (iii) introducing a gas into said cavity to remove said second liquid, and
(b) detonating an explosive charge adjacent to the members so that they are urged into contact with one another and become welded together.

* * * * *